Feb. 9, 1932.  W. J. CHIEVITZ  1,844,540
AIRPLANE LANDING GEAR
Filed Dec. 31, 1928
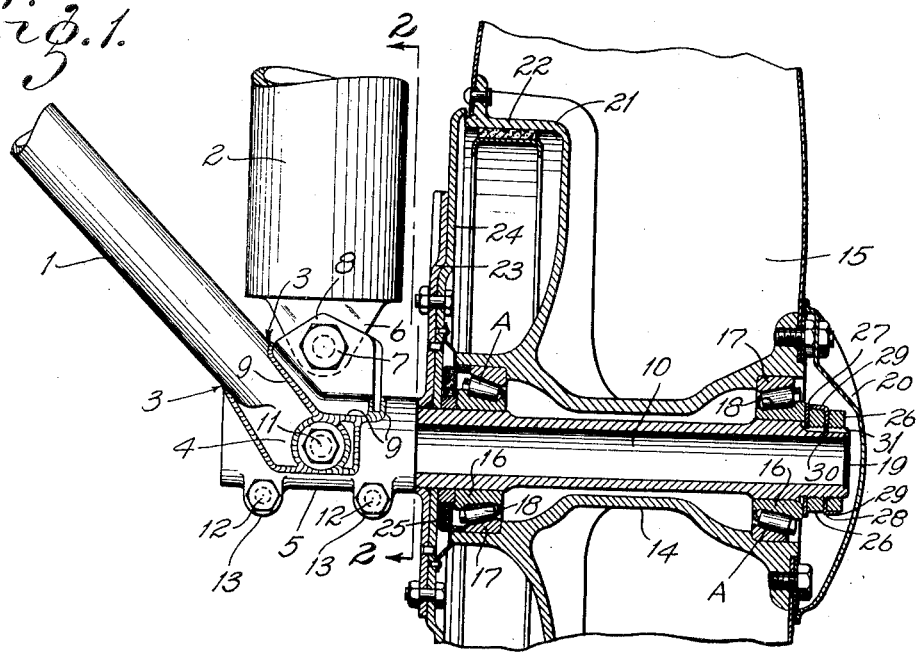
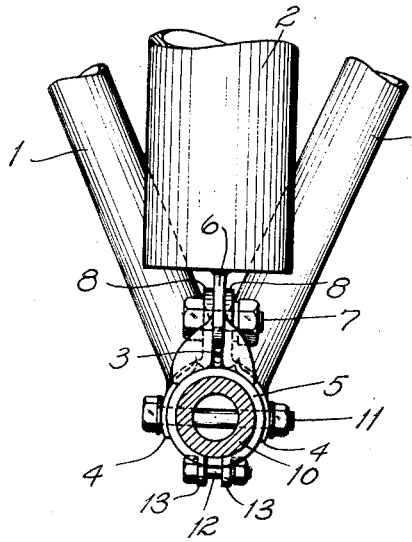
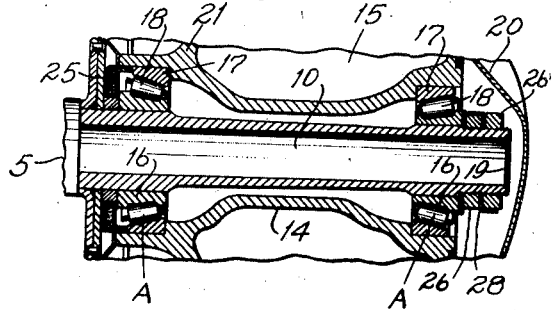
INVENTOR:
William J. Chievitz
by Carr and Carr & Gravely
HIS ATTORNEYS.

Patented Feb. 9, 1932

1,844,540

UNITED STATES PATENT OFFICE

WILLIAM J. CHIEVITZ, OF CANTON, OHIO, ASSIGNOR TO THE TIMKEN ROLLER BEARING COMPANY, OF CANTON, OHIO, A CORPORATION OF OHIO

AIRPLANE LANDING GEAR

Application filed December 31, 1928. Serial No. 329,406.

This invention relates to airplane landing gears of the type wherein the axles, upon which the landing wheels are journaled, constitute an integral part of the inclined tubular struts of the landing gear. The practical objections to the above landing gear are that it necessitates the removal and replacement of the entire strut in the event that the axle portion becomes worn or damaged; it renders difficult and expensive the operation of machining or grinding the axle portion of the tubular strut to the close limits required to obtain a proper fit of the wheel bearings; it does not permit the diameter of the axle portion of the tubular strut to be reduced and thus requires the wheel hubs and bearings to be made larger and heavier than is necessary; and it requires the use of heavy gage tubing to increase the strength of the axle portion of the strut, thereby increasing the weight of the landing gear.

The principal objects of the present invention are to overcome the disadvantages hereinbefore mentioned, by providing the inclined struts of the landing gear with demountable axles that are thick enough to permit machining and threading and are of smaller diameter than said struts, thereby permitting the use of smaller wheel hubs and bearings. Other objects are simplicity and cheapness of construction, compactness of design and ease of assembly. The invention consists in the construction, combinations and arrangements of parts hereinafter described and claimed.

In the accompanying drawings, which form part of this specification and wherein like symbols refer to like parts wherever they occur, Fig. 1 is a side view of the lower end of an inclined strut of an airplane landing gear provided with a demountable axle construction embodying my invention, the axle member and the landing wheel journaled thereon being shown in axial section;

Fig. 2 is a cross-section on the line 2—2 of Fig. 1; and

Fig. 3 is an axial section through a demountable axle and wheel, wherein the outer bearing is made smaller than the inner bearing.

The accompanying drawings show a portion of a split type airplane landing gear which includes the converging lower end portions of a pair of inclined tubular landing struts 1 and the adjacent lower end portion of an upright shock absorbing strut 2. The upper ends of the inclined landing struts and the shock absorbing strut are secured in any suitable manner to the fuselage (not shown) of the airplane. The meeting ends of the two inclined tubular struts 1 are welded or otherwise rigidly secured together, as at 3, and the outer walls of said struts extend below the line of weld to form spaced ears or lugs 4 that are disposed one on each side of and are welded or otherwise rigidly secured to a horizontally disposed tubular fitting in the form of a split cylindrical sleeve 5. The upright shock absorbing strut 2 is provided at its lower end with a depending lug 6, which is pivotally secured by means of a horizontal bolt 7 between two upstanding ears 8 that are welded, as at 9, to the upper surfaces of the inclined struts 1 and the horizontally disposed clamping sleeve 5 carried thereby.

One end of a tubular wheel supporting axle 10 extends into the split clamping sleeve 5 and is rigidly secured therein by means of a bolt 11, which passes through alined openings provided therefor in the ears 4 of the connected struts 1, the split sleeve 5 to which said ears are welded, and the tubular stub axle 10. The axle 10 is further secured to said sleeve by means of two clamping bolts 12, which extend through alined openings provided therefor in opposing ears or depending lugs 13 on the underside of the sleeve adjacent to the meeting edges thereof and thus serve to clamp the sleeve firmly on the axle.

The tubular axle 10 extends far enough beyond the outer end of its supporting sleeve 5 to accommodate the tubular hub portion 14 of a landing wheel 15 of the disk type. Suitable antifriction members, preferably in the form of tapered roller bearings A, are interposed between the axle and the hub of the wheel adjacent to each end thereof. As shown in the drawings, each of said bearings comprises a cone or inner raceway member 16 mounted on a tubular axle 10, a cup or outer raceway member 17 mounted in a recess provided therefor in the hub 14 of the landing wheel 15, and series of conical rollers 18 interposed between said cup and cone and preferably provided with a suitable cage 18. Preferably the wall of the tubular axle is of reduced thickness between bearings in order to save weight.

The outer end of the tubular axle is closed by means of a spring disk 19. A hub cap 20 is removably secured to the outer face of the landing wheel and covers the outer ends of the wheel hub 14 and the axle. The hub 14 of the wheel is provided adjacent its inner end with a flange 21 shaped to form a brake drum 22; and a brake flange 23 is welded or otherwise rigidly secured to the tubular axle between the adjacent ends of the axle supporting sleeve and the hub of the wheel and has a suitable brake cover plate 24 bolted thereto for closing said brake drum. The annular space between the tubular axle and hub of the wheel serves as a reservoir for lubricant, which is prevented from escaping at the inner end of the axle by means of a felt seal 25 and is prevented from escaping from the outer end of the axle by means of the hub cap 20.

The bearings are adjusted to take up wear as by a pair of adjusting nuts 26 threaded on the stub axle beyond the outer end of the outer bearing. As shown in the drawings, a washer 27 is sleeved on the stub axle between the innermost nut and the outer end of the outer bearing; and a nut lock in the form of a washer 28 is sleeved on the axle between the two nuts and is provided at its outer periphery with tabs 29 adapted to be bent over the nuts to prevent rotation thereof. The lock washer 28 is provided at its inner periphery with a tongue or detent 30, which seats within a longitudinal groove 31 provided therefor in the outer surface of the tubular axle and thus prevents rotation of said washer on said axle. By this arrangement the nuts 26 may be adjusted to take up wear of the bearings and then locked in the desired position of adjustment by means of the lock washer 28.

In the modification illustrated in Fig. 3, the outer end of the tubular stub axle is made smaller than the inner end thereof to accommodate the cone of the outer bearing which is made smaller than the inner bearing, thereby providing a construction which is cheaper and of less weight than the construction shown in Figs. 1 and 3.

The foregoing airplane axle construction has many advantages. It permits the axle to be readily removed and replaced without disturbing any other part of the landing gear; it permits the diameter of the axle to be reduced, thereby permitting the use of smaller wheel bearings and hubs; and it permits the wall of the axle to be made thick enough to secure the desired strength and to permit threading. The axle can be easily and accurately machined; and the weight of the landing gear can be reduced by the use of inclined landing struts of lighter section. It is noted as an important advantage of the foregoing construction that the axle, together with the landing wheel and the entire brake assembly, can be removed as a unit merely by removing the single through-bolt 11 and by loosening the two clamping bolts 12 which secure the stub axle to the split sleeve at the lower ends of the inclined struts. It is also noted that said construction affords simple and efficient means for adjusting the bearings to take up wear.

Obviously, the hereinbefore described arrangement admits of considerable modification without departing from the invention; therefore, I do not wish to be limited to the precise arrangement shown and described.

What I claim is:

1. An airplane landing gear comprising a strut provided with a split clamping sleeve, a stub axle having one end mounted in said sleeve, means for clamping said sleeve on said axle, said means comprising a clamping bolt on said sleeve, and a bolt extending through said sleeve and said stub axle.

2. An airplane landing gear comprising inclined landing struts permanently secured together at their lower ends, a tubular member permanently secured to said struts, and a stub axle removably secured rigidly in said tubular member.

3. An airplane landing gear comprising inclined landing struts permanently secured together at their lower ends, a clamping sleeve permanently secured to the connected ends of said struts a shock absorbing strut secured at its lower end to said sleeve, a straight stub axle removably secured rigidly in said clamping sleeve, and a ground wheel removably mounted on said axle.

Signed at Canton, Ohio, this 26 day of December, 1928.

WILLIAM J. CHIEVITZ.